United States Patent [19]
Kersey

[11] Patent Number: 5,706,079
[45] Date of Patent: Jan. 6, 1998

[54] ULTRA-HIGH SENSITIVITY TRANSDUCER WITH CHIRPED BRAGG GRATING RELECTOR

[75] Inventor: Alan D. Kersey, Fairfax Station, Va.

[73] Assignee: The United States of America as represented by the Secretary of the Navy, Washington, D.C.

[21] Appl. No.: 536,028

[22] Filed: Sep. 29, 1995

[51] Int. Cl.⁶ .................... G01C 3/08; G01B 11/02
[52] U.S. Cl. .................................. 356/5.09; 356/354
[58] Field of Search ......................... 356/5.09, 354, 356/345

[56] References Cited

U.S. PATENT DOCUMENTS

| | | | |
|---|---|---|---|
| 4,589,285 | 5/1986 | Savit | 73/655 |
| 4,632,551 | 12/1986 | Pavlath | 356/345 |
| 4,825,424 | 4/1989 | Lamb et al. | 367/141 |
| 5,227,857 | 7/1993 | Kersey | 356/345 |
| 5,361,130 | 11/1994 | Kersey et al. | 356/345 |
| 5,367,588 | 11/1994 | Hill et al. | 385/37 |
| 5,380,995 | 1/1995 | Udd et al. | 250/227 |
| 5,410,404 | 4/1995 | Kersey et al. | 356/345 |
| 5,420,948 | 5/1995 | Byron | 385/37 |
| 5,426,297 | 6/1995 | Dunphy et al. | 250/227.23 |
| 5,469,265 | 11/1995 | Measures et al. | 356/419 |
| 5,493,390 | 2/1996 | Varasi et al. | 356/32 |
| 5,513,913 | 5/1996 | Ball et al. | 374/120 |
| 5,561,675 | 10/1996 | Bayon et al. | 372/6 |
| 5,563,967 | 10/1996 | Haake | 385/12 |

*Primary Examiner*—Mark Hellner
*Attorney, Agent, or Firm*—Thomas E. McDonnell; George Jameson

[57] ABSTRACT

A transducer and measurement system includes a fiber Bragg grating which has a regular variation of spacing of partially reflecting surfaces, known as a chirp, either formed or induced therein and which is capable of reflecting energy having a predetermined wavelength. When the fiber Bragg grating is subjected to a strain, such as by a change in dimension or shape of a transducing element to which it is attached with change of a physical parameter to which the transducing element or the fiber Bragg grating is exposed, the location within the fiber Bragg grating which effectively reflects the predetermined wavelength will be formed (e.g. when the chirp is induced) or altered as the strain alters spacing of partially reflecting surface within the fiber Bragg grating allowing long optical fibers, such as are used in magnetometers and hydrophones, to be simulated with short optical fibers including a fiber Bragg grating.

5 Claims, 6 Drawing Sheets

CHANGE IN REFLECTION POINT WITH STRAIN APPLIED TO A CFBG REFLECTOR

FIBER MICHELSON INTERFEROMETER WITH CHIRPED
FIBER BRAGG GRATING SENSING ELEMENT

FIG. 5

PUSH-PULL FIBER MICHELSON INTERFEROMETER WITH
CHIRPED FIBER BRAGG GRATING SENSING ELEMENT

FIG. 6

FIG. 7 FABRY-PEROT CAVITY WITH OPPOSING CHIRPED FIBER BRAGG GRATINGS

ULTRA-HIGH SENSITIVITY TRANSDUCER WITH CHIRPED BRAGG GRATING RELECTOR

BACKGROUND OF THE INVENTION

1. Field of the Invention

The present invention generally relates to transducers for measurement systems for measuring physical conditions using radiant energy as a measurement medium and, more particularly, to reflective transducers for fiber-optic measurement systems.

2. Description of the Related Art

A wide variety of systems and apparatus for measurement of physical conditions such as temperature, forces, movement or position, frequency, acceleration electrical parameters and the like have been developed to provide information which is not conveniently obtainable with the human senses to the degree of quantization or resolution which may be desired. The degree of quantization, resolution or minimum detectable change (e.g. collectively: sensitivity) obtainable from a measurement system is often limited by the physical medium used to sense the physical parameter of interest. For instance, if a variable frequency signal (e.g. acoustical, electrical, light, etc.) is used for measurement, the resolution of the measurement system will generally be limited by the wavelength or frequency of that signal. For this reason, measurement with radiant energy of relatively short wavelengths (e.g. visible light, ultra-violet, etc.) has been of substantial recent interest.

By the same token, the size of the transducer will generally limit the spatial resolution of the measurement; averaging (with or without weighting) the conditions sensed over the physical extent of the transducer. For example, the field of view of a photocell will determine the area over which an average (possibly weighted) measurement will be taken.

Fiber optic interferometric measurement systems have thus been developed for a wide range of measurement application, particularly where high sensitivity is required since even a very small dimensional change may be many times the wavelength of light used for sensing. A variety of optical configurations are now well-known for use in such applications including those types of configurations generically known as Mach-Zehnder, Michelson, Fabry-Perot and ring resonator configurations; the two beam Mach-Zehnder and Michelson configurations being the most commonly used since the two beams characteristically used (e.g. as a reference and probe, respectively) may be readily compared as to the length of the respective optical paths.

In these two beam configurations, the sensitivity of the interferometer (as it is generally called, regardless of the actual effect used for comparison) is determined by several factors including the responsivity of the transducing material (e.g. the compliance of an acoustic sensor or the "C" value of a magnetostrictive material), the length of fiber bonded to the transducer, and the noise performance of the transducer (e.g. the intensity, frequency or wavelength stability of the light source, shot noise, etc.). In many fiber optic sensor configurations, particularly of the Mach-Zehnder, Michelson and Fabry-Perot types, the transducing material is often the optical fiber, itself and the responsivity and length of fiber required for a particular application are often dictated by the physical characteristics of the optical fiber material. That is, the compliance (e.g. normalized elongation, positive or negative, per unit of tensile or compressive force applied) of the optical fiber is often limited to a relatively narrow range with a maximum elastic elongation before fracture of about 1.0%. While the maximum elastic elongation is generally small, an elongation of any significant fraction of the maximum elastic elongation is readily detectable by interferometric techniques. However, the length of optical fiber must also be matched to the physical device which causes the elongation as well as the range of values of the parameter (e.g. dynamic range) which is to be measured; often resulting in the use of relatively long lengths of optical fiber in the transducer, particularly when the transducing effect (e.g. magnetostriction) is subtle.

Further, it is sometimes desirable to perform detection by measurement of delay, rather than by interferometric techniques. Given that the speed of light (or other electromagnetic energy, which may be collectively referred to hereinafter as, simply, "light") in an optical fiber is about one meter (one way) in five nanoseconds, it is seen that quite short light pulses and long lengths of optical fiber may be required in order to provide both the needed resolution and dynamic range of measurement. For example, fiber optic interferometers often involve tens of meters of optical fiber wound on a volume (e.g. cylinder) of transducing material. Hydrophone and magnetometer applications, in particular, requiring high sensitivity to relatively feeble signals commonly require fiber lengths well in excess of thirty meters.

Optical fibers may be of very low lossiness, losing about one-half signal power over about ten kilometers. Therefore, transducers employing even very substantial lengths of optical fiber do not generally pose a problem of sensing energy transmission. However, the cost of manufacturing a transducer employing very long lengths of optical fiber is often affected, if not dominated, by the cost of installing long lengths of optical fiber on a transducing material. Further, while optical fibers can be and generally are of small cross-sectional area, the overall volume or spatial extent of a long fiber, particularly if regularly wound on a volume of transducing material in a single or small number of layers, may result in relatively large dimensions and low spatial resolution for the completed transducer. Further, lossiness of an optical fiber is increased by the sharpness of bends therein and thus limits the radius of the volume on which it can be wound, consistent with acceptable light losses.

Also, in many applications, it is desirable to bond the transducer to an existing structure rather than a dedicated volume of transducer material. For example, to monitor load carrying stresses or condition of structural members of a large structure such as a bridge, building or ocean-going vessel hull, it may be desired to bond the optical fiber directly to a structural member thereof. If a substantial length of optical fiber is required for the transducer, considerable labor and expense may be required. Further, if a long length of cable is required for a reference optical path, length of cable, the dimensional stability of the cable and the dimensional stability of the structure on which it is wound as well as the physical extent of the reference optical path structure may all be sources of noise in the measurement system. For this latter reason, problems of stability and calibration are often fairly intractable and often require relatively complex systems to obtain relatively marginal improvements in performance.

Accordingly, it is seen that a design conflict or trade-off exists as to optical path length between sensitivity and dynamic range, on the one hand, and physical dimensions, spatial resolution, cost, convenience and noise susceptibility or performance on the other. Therefore, there is a need for developing increased sensitivity and resolution with reduced lengths of optical fiber which has not been heretofore available in the art. For example, the known use of a single reflector in the transducing optical path yields only a reduction of one-half in cable length and which is of little economic benefit and even more marginal performance benefit at the optical fiber lengths usually employed. The use of a resonant cavity with two or more reflectors may cause unwanted interference effects, instability and susceptibility to noise and drift since any small variation in cavity length is multiplied many times in the variation of effective optical path length particularly when a resonant laser system is used to monitor path length.

As background for understanding the particular optical device exploited in the present invention, It should be recognized that numerous devices are known which produce optical effects dependent upon the wavelength(s) of light incident thereon and then transmitted or reflected. The familiar prism functions to separate light incident at an angle to a first surface (since the angle of refraction at an interface between materials of differing refractive indices is wavelength dependent). Similarly, the well-known diffraction grating having closely spaced reflective surfaces can spatially separate wavelengths of light depending on the angle of incidence and the angles of reflection at which reinforcing interference effects for respective wavelengths as a weighted average of reflections from all reflective surfaces of the grating. The so-called Bragg grating or Bragg cell is a special case of the diffraction grating having regularly and closely spaced partially reflective planar surfaces such as may occur in a crystal for energy wavelengths in the X-ray regime. A similar array of surfaces spaced in adequate proximity to reflect visible light can be formed in an optical fiber in numerous ways as summarized in U.S. Pat. No. 5,367,588 and 5,380,955.

In such devices, strong reinforcing interference effects occur at angles where the difference in path lengths reflected from adjacent planes (for any chosen angle of incidence and reflection) equals a whole number of wavelengths of the incident energy. That is, light of a particular wavelength will only be strongly reflected at particular angles.

When a Bragg cell is limited to an angle of incidence (which is equal to the angle of reflection) perpendicular to a plane parallel to the partially reflective planes, the Bragg cell is strongly reflective only at integral multiples of a single wavelength which is twice the spacing of the reflective planes. That is, under such a constraint, as would be the case in a Bragg cell formed in a length of optical fiber (known as a fiber Bragg grating or FBG), a Bragg cell provides a highly wavelength-selective reflector which will strongly reflect incident radiation at the Bragg wavelength. This effect has been exploited for a temperature measurement system using normal Bragg gratings to provide a robust sensor of small size which is physically stable over time. However, since the Bragg wavelength varies as temperature changes cause alteration of spacing of partially reflecting surfaces, swept or chirped light sources or broad spectrum light sources with chromatic filtration are required at either increased expense and complexity or reduction in accuracy and resolution.

Of course, in a Bragg cell, the sharpness of the reflection characteristic will vary with the number of partially reflecting planes and the regularity of their spacing. Accordingly, the concept of a chirped Bragg cell (in which the period of the grating (e.g. the spacing of the partially reflective planes or surfaces is gradually varied over the grating length, that is, the spacing between consecutive pairs of a sequence of reflecting planes is slightly increased or decreased) has been a theoretical curiosity for some years since the geometry of varied spacing of partially reflective planes inherently violates the geometry assumed by Bragg's Law. It has been only recently that an operational chirped Bragg cell has been fabricated. Even then, the manufacturing techniques are not well-developed and actual performance of such cells has not closely approached or even approximated possible or predicted theoretical behaviors which might be expected of such devices, much less led to any practical application of such devices prior to the present invention.

SUMMARY OF THE INVENTION

It is therefore an object of the present invention to provide an optical fiber transducer of high sensitivity and dynamic range with an optical device of short path length.

It is another object of the invention to provide for simulation of a long length of optical fiber with an optical fiber or device of small overall dimensions and short actual length.

It is a further object of the invention to provide an optical fiber measurement system of high sensitivity which can be readily and dynamically calibrated and easily stabilized with reduced susceptibility to noise and drift.

In order to accomplish these and other objects of the invention, a transducer responsive to changes of a physical parameter is provided which includes an optical fiber including a chirped fiber Bragg grating, and an arrangement for applying an elastic strain to a portion of the optical fiber in response to changes of the physical parameter.

In accordance with another aspect of the invention, a transducer responsive to variation over distance of a physical parameter is provided including an optical fiber including a fiber Bragg grating, an arrangement for applying a gradient of elastic strain to a portion of the optical fiber including the fiber Bragg grating in response to variation over distance of the physical parameter, and an arrangement for detecting a chirp induced in the fiber Bragg grating.

In accordance with a further aspect of the invention, a method of measuring a physical parameter is provided including the steps of applying at least a portion of an energy pulse having a wavelength to an optical fiber including a fiber Bragg grating having a chirp, applying strain to the fiber Bragg grating in response to the physical parameter, and determining propagation delay of the energy pulse in the optical fiber including a portion of the fiber Bragg grating which effectively reflects the energy pulse.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
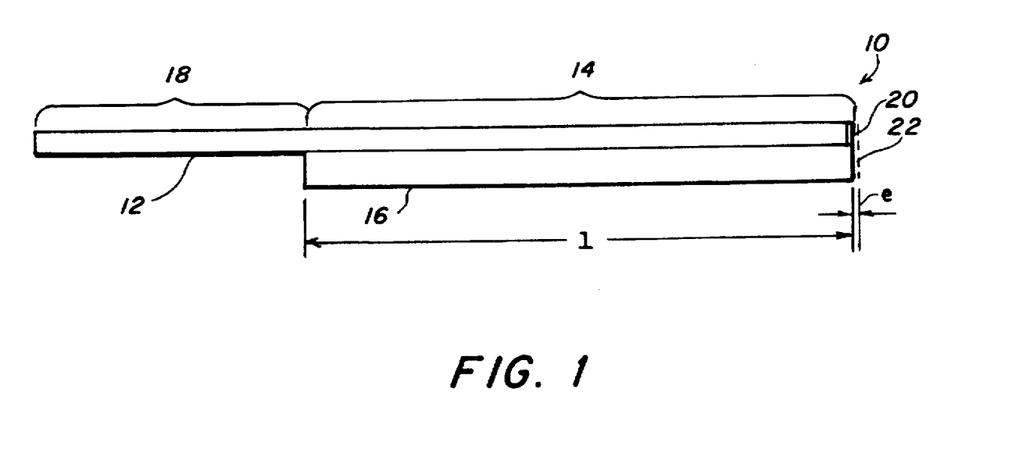
FIG. 1 illustrates a known form of transducer including a length of optical fiber including a mirror reflector.

Referring now to the drawings, and more particularly to FIG. 1, there is schematically shown, a form of a fiber optic sensing element 10 which may be readily contrasted with the invention. It is to be understood, however, that no portion of FIG. 1 is admitted to be prior art as to the present invention but, rather, is intended as a simple illustration of a system which will readily convey an understanding of the invention and an appreciation of the advantages thereof.

Sensing element 10 comprises a length of optical fiber 12, a portion or length 14 of which is terminated by a mirror or other type of reflector 20, such as a dichroic filter, sharp change of refractive index or the like. Portion 18 of the optical fiber serves only to conduct light to and from portion 14 and may be omitted. Length 14 of optical fiber 12 is attached to a mechanical element 16 which may be of the form of a mandrel, as illustrated, or in any other form such as a structural member or cylindrical shell or volume of material on which the length of optical fiber 14 is wound or otherwise attached. The only property of the mechanical element 16 important to an understanding of the invention or enablement of practice thereof is that some physical quantity of interest can alter the length or shape of the mechanical element and that the alteration of length or shape is mechanically coupled to length 14 of optical fiber to alter the length thereof by an elongation e shown by dashed line 22.

For simplicity, in the following discussion, length 1 of optical fiber portion 14 is assumed to be one meter. As noted above, however, subtle physical effects may require much greater lengths of optical fiber for a desired degree of sensitivity. It will be recalled that the maximum elastic elongation of the fiber due to such physical effects on mandrel 16 is limited to about 1% or one centimeter although, in general, the physical effect being measured or monitored will cause an elongation of only a very small fraction of the maximum elongation.

In any case, the physical effect will cause a change of optical path length (e.g. twice the elongation when the energy is transmitted and returned through the sensor) which can be detected by well-known interferometric techniques (e.g. detecting phase shift) or time delay measurement. The change of optical path length which can be thus detected is limited to a maximum of about one centimeter (per meter) without fracture of optical fiber portion 14. Of course it should be recognized, in regard to the compliance of the sensor, that a given force will provide the same proportional elongation regardless of the length of optical fiber portion 14 and, conversely, a given elongation can be achieved at any arbitrarily small force by increasing the length of fiber.

Figure 2A:
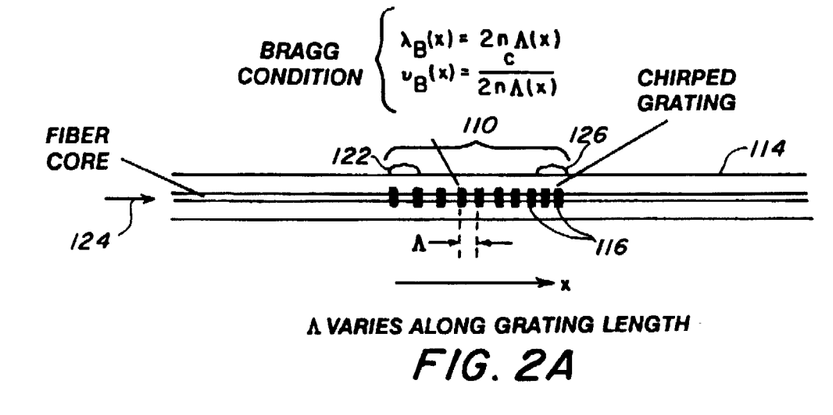
FIG. 2A illustrates a chirped Bragg cell formed in an optical fiber, FIGS. 2B and 2C graphically illustrate properties of the chirped fiber Bragg cell (CFBG) of FIG. 2A.

A chirped fiber Bragg cell (CFBG) 110 is shown in FIG. 2A at an arbitrary location in a length of optical fiber 114. Preferably, the fiber includes a core surrounded by one or more cladding layers to reduce light loss. However, the construction of the fiber is not important to the practice of the invention so long as the partially reflecting surfaces 116 extend across a significant portion of the cross-section of the fiber through which optical power is transmitted (e.g. across a principal portion of the evanescent field which extends slightly beyond the core, as shown).

Figure 2B:
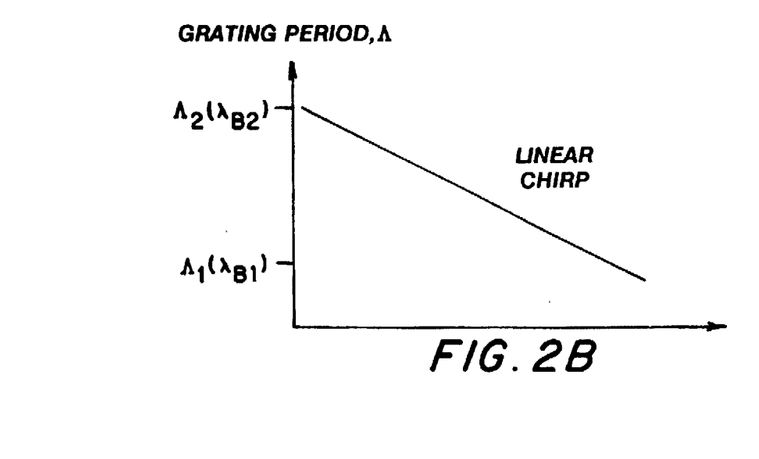

Characteristically, as discussed above, a chirped Bragg cell is fabricated with partially reflecting surfaces 116 variably spaced such that the distance $\Lambda$ between consecutive partially reflecting surfaces varies in some regular manner (e.g. assumed to be a linear variation for purposes of this discussion, as shown in FIG. 2B). As with a normal Bragg cell with equally spaced surfaces, a chirped Bragg cell provides reflection as an interference effect based on the relation of the wavelength of incident energy to the spacing $\Lambda$. Therefore, in a normal Bragg cell, strong reflection will occur at substantially only in a narrow pass-band around a single wavelength (and multiples thereof) from roughly the center of the normal Bragg grating. (In practice, the apparent location of the effective reflecting surface will be located somewhat toward the side of the grating from which energy is input since each partially reflecting surface will cause diminution of the energy transmitted to other partially reflecting surfaces and the interference effect is thus a weighted average of all reflections, more strongly favoring the reflections from surfaces where light intensity is greater or less attenuated.)

In contrast, in the chirped Bragg grating, the spacing of partially reflecting surfaces is a function of the location within the chirped Bragg cell and, since reflection occurs when the wavelength of input energy is an even multiple of the spacing of partially reflectingsurfaces, the location from which energy of a given wavelength is effectively reflected (e.g. the location at which the Bragg condition will be met) is a function of wavelength. (Of course, it should be understood that, theoretically, wavelengths might exist at which the Bragg condition may not be met to produce an interference effect and thus not be effectively reflected from a chirped Bragg cell. However, transmitted light will be attenuated by the partially reflecting surfaces in any case.) Conversely, the wavelength which will be reflected varies as a function of location within the chirped Bragg cell where the spacing of partially reflecting surfaces meets the Bragg condition. This relationship is quantitatively expressed in terms of wavelength as $$\lambda_B(x)=2n\Lambda(x), \tag{1}$$

or, in terms of frequency, $\nu$, as $$\nu_B=c/(2n\Lambda(x)). \tag{2}$$

Figure 2C:
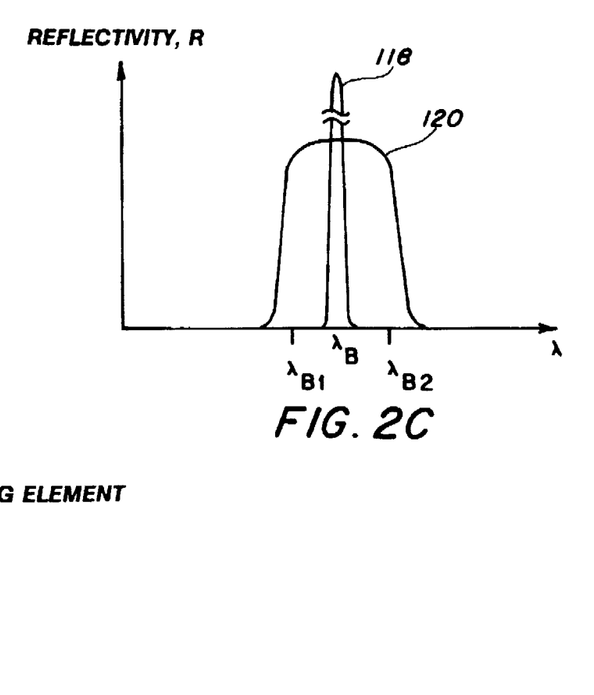

Thus, for a variation of spacing of partially reflecting surfaces between $\Lambda_1$ and $\Lambda_2$, the reflection characteristic would appear as depicted at 120 of FIG. 2C, in comparison with the reflection characteristic 118 of the normal Bragg cell.

Now consider the fact that the elastic deformation properties of optical fiber 114 are not significantly affected by the presence of partially reflecting surfaces 116 of a Bragg cell or, more importantly, a chirped Bragg cell 110. If, in accordance with a possible embodiment of the invention, a 1% chirp (or any other arbitrary chirp, although it will be convenient for this discussion and an understanding of the invention to assume the chirp to correspond to the maximum elastic deformation of the fiber) were provided in the chirped Bragg cell, and the spacing of partially reflecting surfaces arranged such that the wavelength, $\lambda$, was effectively reflected from approximately the end 122 of the chirped grating opposite the light source 124 where $\lambda=2n\Lambda$. If the fiber is now subjected to tension sufficient to cause a 1% elongation, the spacing $\Lambda$ between partially reflecting surfaces 116 would also change by 1% such that a spacing of $\Lambda=2n\lambda$ would now exist at the end of the CFBG nearer the light source. The location of effective reflection would thus traverse the length of the chirped Bragg grating because, after such elongation the Bragg condition would now be met by the spacing of partially reflecting surfaces at location 126.

Figure 3:
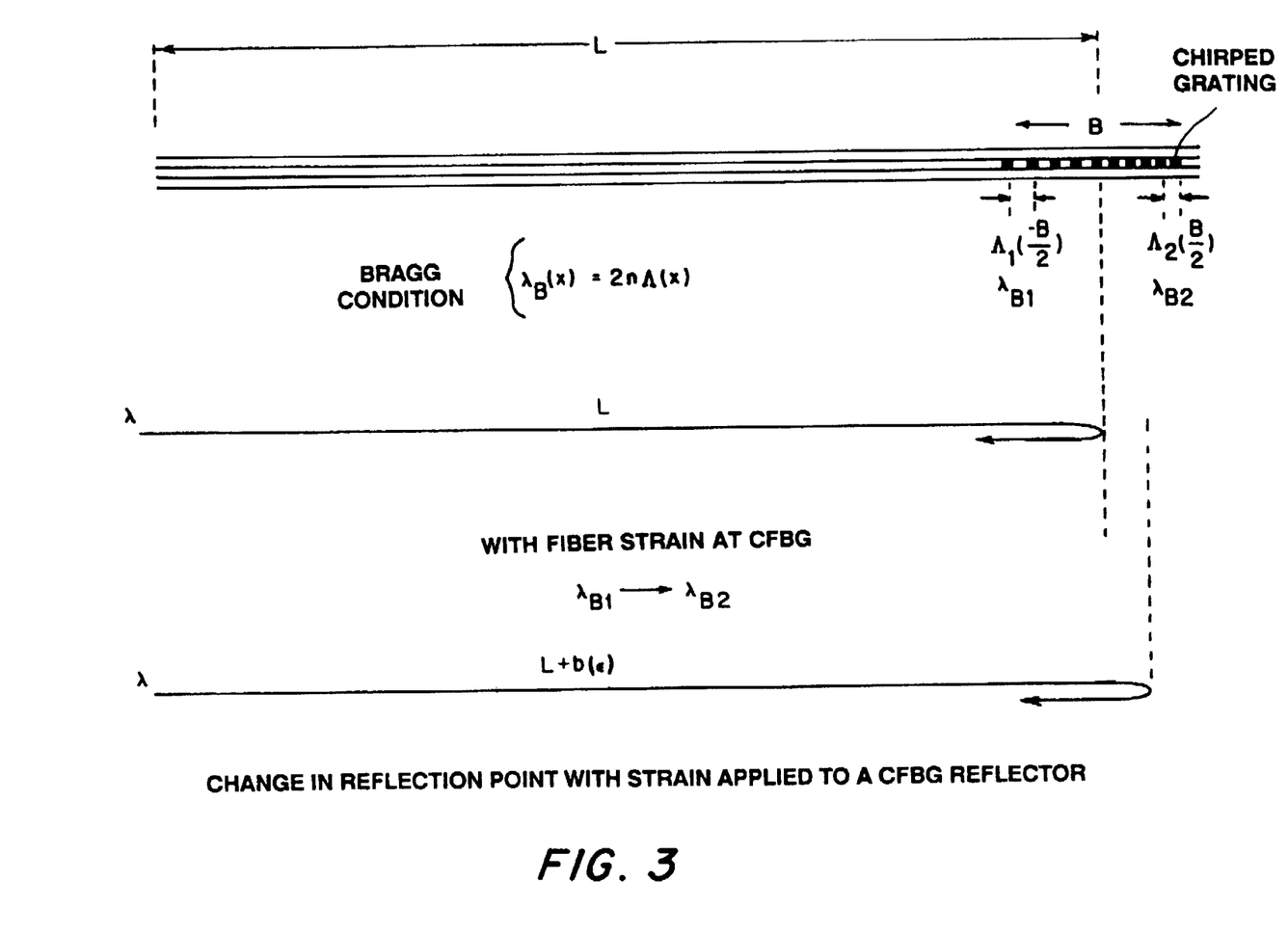
FIG. 3 shows an optical fiber including a CFBG reflector in accordance with the invention, FIG. 4 graphically illustrates effective fiber sensing length as a function of chirp rate.

In terms of FIG. 2C, the spacing change due to elongation equal to the chirp has the same effect as a change of wavelength from $\lambda_{B2}$ to $\lambda_{B1}$. Thus, if a 1% chirp were to be provided over a chirped Bragg cell having a length of one centimeter, the change in optical path length due to a given applied force, would be the same as the change for which one meter of optical fiber would be required in the sensor of FIG. 1. This change in effective reflector location within the chirped grating length B is illustrated in FIG. 3. In this case, as illustrated, the wavelength is chosen to establish a nominal fiber length L near the center of the chirped Bragg grating in order to sense both tensile and compressive forces causing positive and negative elongations of the CFBG over its length, B. In the case where only tensile or compressive force is anticipated or to be measured, it is also preferred to place the effective location of reflection at zero or a nominal stress well within the CFBG in order to avoid variation of amplitude of reflected energy, as will be discussed more fully below.

Figure 4:
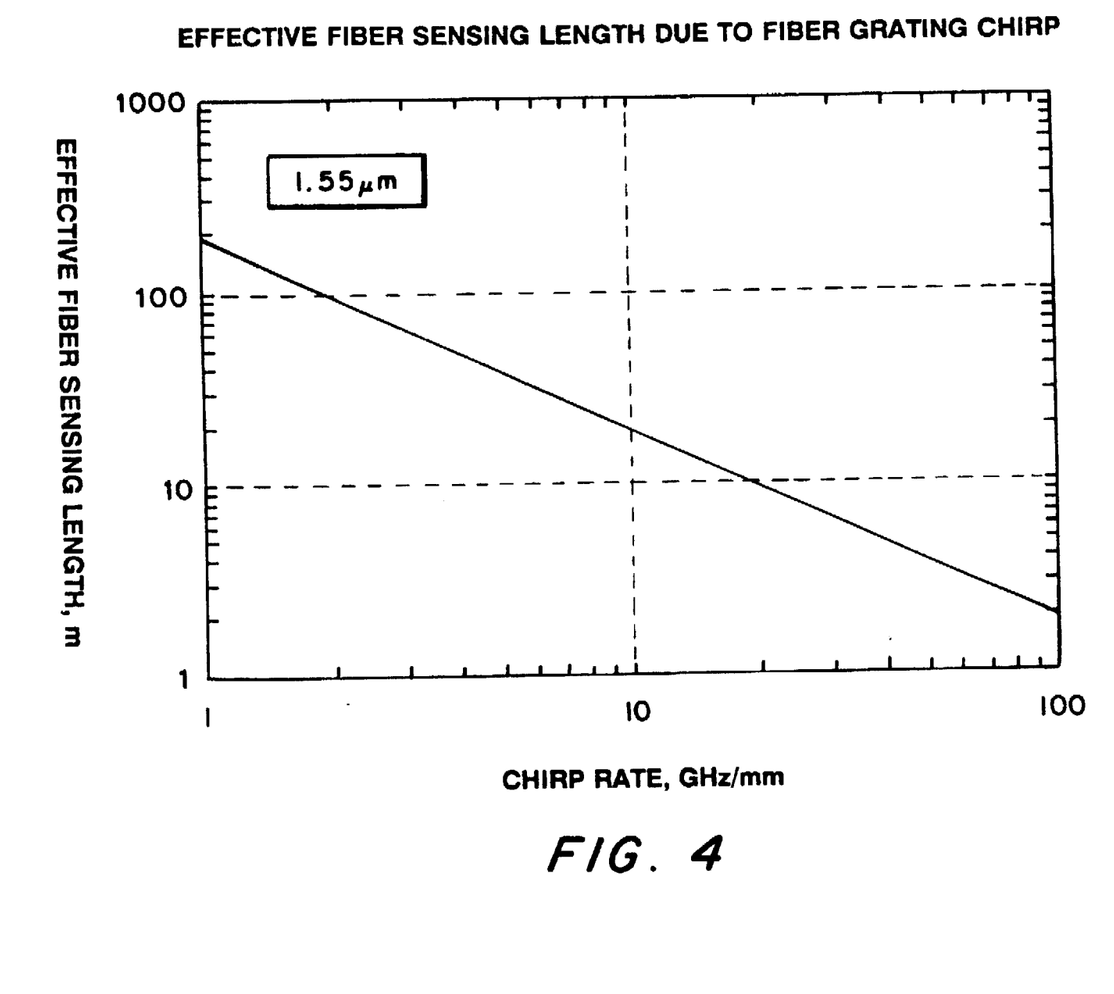

Thus, even in this rudimentary and highly simplified example, it can be seen that a reduction of 99% in the length of fiber optic cable required for a given sensitivity (e.g. resolution, compliance, etc.) is provided by the invention. In practice, and counter-intuitively, it should be noted that while the sensor configuration of FIG. 1 functions substantially identically for all wavelengths, shorter wavelengths (for a given range of $\Lambda$) in the configuration of FIG. 2, in accordance with the invention, simulate greater lengths of fiber optic cable in the sensor of FIG. 1. A graphical depiction of the effective fiber sensing length as a function of chirp rate is shown in FIG. 4. It should be appreciated that a particular CFBG with a particular chirp will exhibit higher chirp rate (e.g. change in effective reflector location with energy frequency, $\Delta v/\Delta x$) as $\lambda=c/v$ becomes small. Thus, in practice, for currently practical ranges of $\Lambda$ and $\lambda$, the benefits are approximately ten times those of the simplified example discussed above; yielding approximately 99.9% decrease in the length of optical fiber required for the sensor and very substantial reductions in sensor cost both in optical fiber and assembly. (Alternatively, sensitivity of the sensor may be arbitrarily changed or increased by alteration of wavelength.) Even though CFBGs are a relatively recent development and are expensive to produce since the technology for doing so is not well-developed, the reduction in fiber length and corresponding sensor assembly costs generally offset the currently greater cost of CFBGs while providing potential performance enhancement.

While the above explanation of the invention will enable the practice thereof for general applications by those skilled in the art, in the design of sensors employing the invention, several practical considerations and design trade-offs should be observed in particular applications in which the invention may be used; some of which applications are beyond the capabilities of known optical sensors. For example, referring again to FIG. 2C, the reflectance characteristic can be considered basically as that of a normal Bragg cell which is "detuned" in a very special and regular way. That is, for a given length of grating, the reflection characteristic will be broader as a function of wavelength but considerably less strong because relatively fewer reflecting surfaces having a $\Lambda$ closely corresponding to the illuminating wavelength, $\lambda$, will contribute to the weighted average of partial reflections of which the reflection is composed. That is, while sensitivity may be increased by increasing the chirp rate (e.g. increasing $\Delta\Lambda/\Delta x$), the effect exploited by the invention would become weaker for a given length of CFBG. (Accordingly, it is not only surprising that useful results of consistent repeatability, accuracy and sensitivity can be achieved from even relatively short lengths of CFBG but that the principles of the invention can be utilized in a wide variety of transducer designs with improved functionality or sensitivity or both.)

The chirp should exceed the bandwidth of an unchirped grating (e.g. greater than $1:10^4$) in order to provide useful results in accordance with the invention. By the same token, the full breadth of, for example, a 1% chirp may only be utilized (without compensation for intensity of reflected energy, if necessary) by extending the length of the CFBG and the chirp by about 10% to 50% (e.g. for a total chirp of about 1.1% to 1.5%) so that the full anticipated dynamic range of the measurement will occur in the flat portion of curve 120.

Conversely, the intensity level of the reflected energy or power referred to the input energy or power can be increased proportionately with increasing length (and corresponding decrease in $\Delta\Lambda$ between partially reflecting surfaces (e.g. the rate of change of $\Lambda$ with $x$)) of the CFBG. At the present state of the art, the length of a CFBG is limited to about 10 centimeters (which, even with restriction of the portion of the chirp used for measurement, preferred to be about one-half of the CFBG length, allows a length of in excess of 500 meters of optical fiber in a sensor to be simulated). Nevertheless, plural CFBGs with contiguous chirps can, within limits of energy transmission efficiency, be placed in series in an either adjacent each other or in a separated fashion and a chirp strength (e.g. the distance or length of optical fiber over which the chirp extends) should be, in the aggregate, about 30 centimeters at the present state of the art.

It should be recognized, as well, that the elongation of the CFBG due to applied force is relatively small and the accuracy with which the CFBG is fabricated may easily affect the linearity or other function $\lambda_B(x)$. For that reason, it is important to assure, to the extent possible, that forces applied to the CFBG do not significantly alter the function $\lambda_B(x)$ of the CFBG since $\Lambda(x)$ can meet the Bragg condition only in one or more relatively localized regions if forces are not evenly distributed thereover. For that reason, attachment of only the ends of the CFBG to a transducing element or other monitored structure (or bonding the CFBG to another structure so mounted) may be advisable to prevent anomalous results which could potentially occur if the CFBG is bonded to the transducing element over the entire length of the CFBG.

Conversely, it should also be recognized that the principles of the invention can be applied to a normal Bragg cell which may be bonded or otherwise securely attached to a transducing element over its length. Stresses and resultant elastic strains in a normal Bragg grating cause a shift of Bragg wavelength given by $$(1/\lambda_B)(\delta\lambda_B/\delta\epsilon)=\zeta$$

where $\zeta$ is a constant determined by the photoelastic properties of the fiber material in the same manner as a CFBG. Thus, gradients of strain or localized strains in a normal Bragg cell can be detected by virtue of the chirp induced by the gradient of stress. A plurality of gradients or localized strains could be quantitatively measured by modulation of the input wavelength and correction of the measured gradient on the basis of the location at which the gradient or localized stress is detected. Thus, the principles of the invention may be used to detect the location(s) of variations of or gradients in a physical parameter over a distance inducing chirp(s) in a normal Bragg grating. For example, using a transducing element having a known coefficient of thermal expansion to which the fiber Bragg grating is bonded over its length, thermal gradients such as occur through such phenomena as heat transfer or flow through a body of material can be detected or measured using the principles of the invention.

It should also be understood, particularly in the course of the following discussion, that the change in path length provided by the change of effective reflector location in a CFBG has only been observed as a strong effect through measurement of delay due to the time required for energy to traverse the optical path at about twenty centimeters per nanosecond. While the reason is not, at present, understood (and may, in fact, be due to manufacturing irregularities in CFBGs), measurement of change of path length by detecting phase change through interferometric techniques has not yet been reliably achieved and it is uncertain, at the present time, whether or not phase change has even been observed, even though change of path length can be readily detected with very high accuracy through measurement of delay.

It follows, therefore, that very short energy pulses of a small fraction of a nanosecond or comparable energy modulation with well-defined shapes (e.g. rise and/or fall times) which has been available in the art for several years should be used for measurement of delay. While the constraint of pulsing or modulation of the input energy source infers that all measurements will be discrete rather than continuous, modulation can be carried out at very high repetition frequency to provide effectively continuous monitoring or measurement. However, because of the discrete nature of the measurements, some provision for synchronization of sampling with another process which may affect or be monitored by use of the invention may be desirable.

Figure 5:
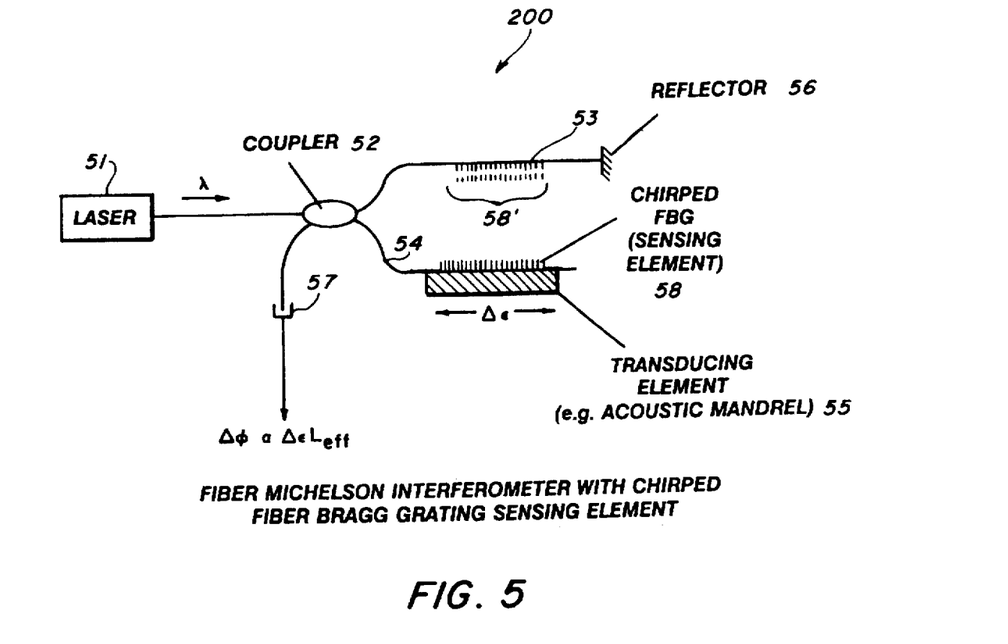
FIG. 5 shows a Michelson interferometer configuration sensor using a CFBG reflector in accordance with the invention.

Referring now to FIG. 5, a simple implementation of the invention utilizing a Michelson interferometer optical configuration 200 is shown. As is well-understood in the art of optical transducers and other measurement systems which can be affected by environmental conditions such as noise, drift, temperature and the like, it is generally useful to provide for derivation of a reference signal. As is well-known in optical measurement systems this is often done by propagating an optical signal over two paths which are substantially identical or at least calibrated to each other and subjecting both paths, as nearly as possible, to the same conditions except the condition of interest. However, this latter practice generally requires equal lengths of optical fiber and effectively doubles the bulk and cost of the transducer. Additionally, when long lengths of optical fiber are required, the length of optical fiber, itself can be a significant source of noise and drift.

Such a reference signal, in addition to providing the possibility of compensation for environmental effects, also simplifies the apparatus required for measurement and avoids some calibration requirements. For example, the difference between the timing of two return signals, one of which varies with the monitored parameter, provides a direct functional relationship to the measured parameter rather than timing between the input and return pulses in the simple sensor of FIG. 3.

While the implementation of the invention shown in FIG. 5 employs a known Michelson interferometer configuration, including an energy source 51, such as a laser, a coupler/splitter 52 and two optical paths 53, 54; one being terminated in reflector 56, this implementation utilizes a short CFBG 58 attached (e.g. bonded) to a transducing element 55, the total lengths of optical fiber sections 54 and 58 is relatively short and therefore fiber 53 can be made short, as well.

Optical fiber length 53 is of comparable length to the total length of 54 and 58 and is thus easily accommodated in a sensor of small size. Further, since the reflector 56 is not affected by the measured dimensional changes of transducing material 55, fiber 53 could be mounted thereon or at any other convenient location or structure and can thereby be exposed to any condition for which compensation is required. Additionally, recalling that elongation of the CFBG shortens the optical path if $\Lambda_1$ ($<\Lambda_2$) is placed at the input end of the CFBG, elongation of fiber 53 with the fiber-optic temperature sensor would have the effect of slightly increasing the sensitivity by a proportional amount while continuing to provide a source of signal variation for possible compensation for environmental conditions. The coupler 52 also provides a convenient additional path for the returned reflective energy to be sensed at an optical detector 57.

As an alternative compensation arrangement, reflector 56 could be omitted and replaced by another CFBG 58' at a convenient location in fiber 53. If CFBG 58' is arranged with the chirp oriented in the opposite direction from CFBG 58 but decoupled from the elongation of the transducing material 55, CFBG 58' can be used to monitor variation in $\lambda$ provided from source 51 and provide compensation therefor.

Figure 6:
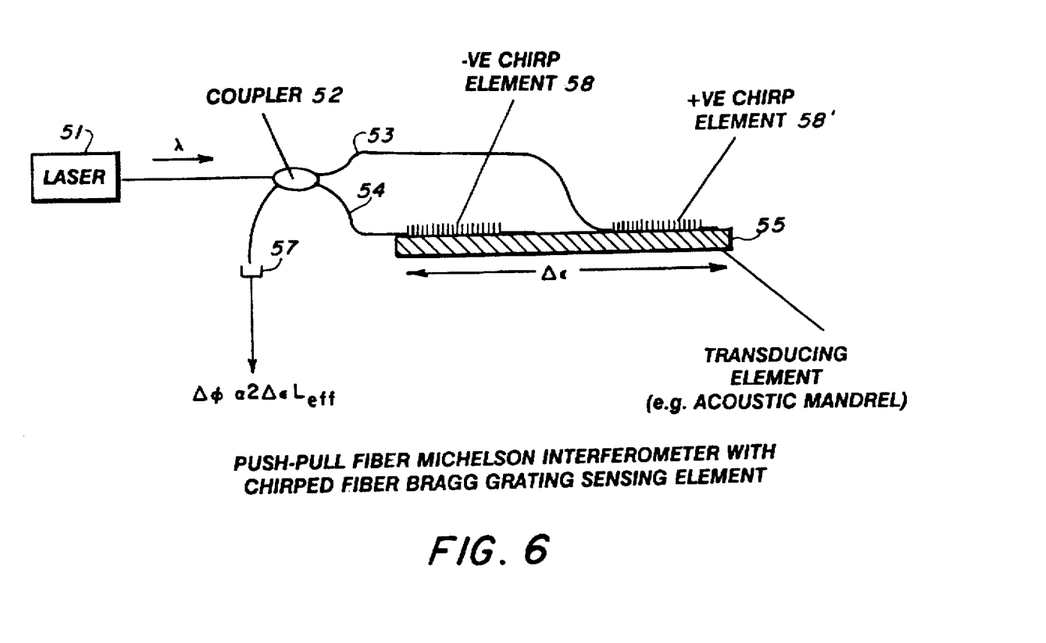
FIG. 6 illustrates a variation of the sensor configuration of FIG. 4 capable of providing measurement compensation or increased sensitivity.

Another variation of the embodiment of FIG. 5 is shown in FIG. 6. In this case, two oppositely oriented CFBGs are coupled to the elongation of transducing material. Elongation, $\Delta\epsilon$, then causes a decrease in path length in one of optical fiber arms 53, 54 and an increase in the other, thus effectively doubling the sensitivity of the measurement which is equivalent to doubling the length of optical fiber in a conventional sensor which is simulated in accordance with the principles of the invention. At the present state of the art of CFBGs and optical discrimination and timing circuitry, this arrangement would allow optical fiber lengths of up to about three thousand to four thousand times the length of available CFBG. If serial sections of CFBG are used, simulation of lengths in excess of one kilometer of optical fiber is readily achievable with the invention.

A variation of the optical system configuration shown in FIG. 6 in which the CFBGs were similarly oriented (or normal Bragg cells substituted therefor) would allow the sensing of gradients in the measured parameter over a greater length or area. It should be noted in this regard that other combinations of optical fiber with a mirror reflector (e.g. 53, 56 of FIG. 5), normal Bragg cells and similarly and/or oppositely oriented CFBGs and possibly plural input energy sources with similar, different or harmonically related wavelengths can be concurrently used with so-called star couplers, themselves well known in the art, having a greater number of inputs and outputs in order to derive virtually any functionality for sensing one or more physical parameters while compensating for any combination of potentially interfering environmental effects. It will also be recognized by those skilled in the art in view of the present disclosure that virtually any interferometer configuration type as well as other optical arrangements, including the simple arrangement of FIG. 3 is suitable for use with the invention so long as delay due to path length change can be observed.

Figure 7:
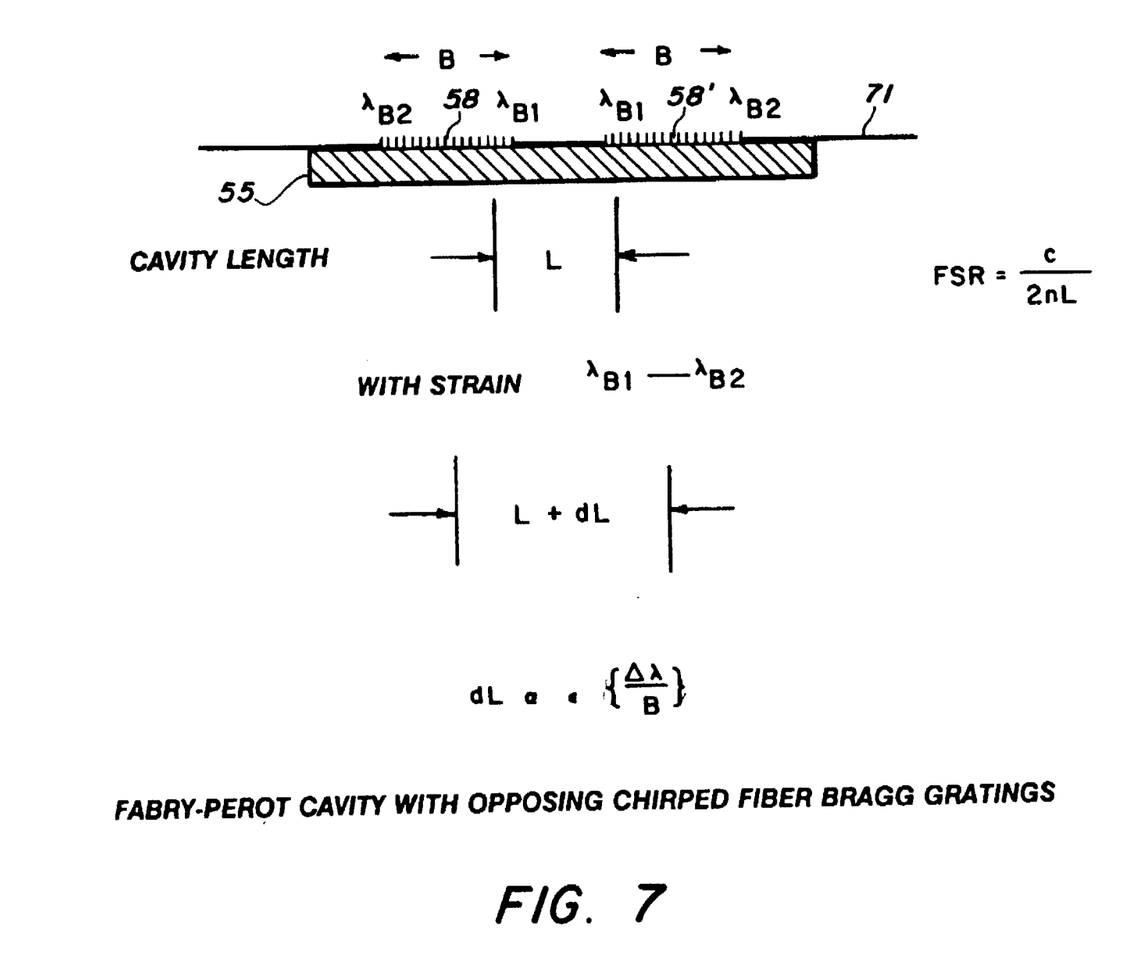
FIG. 7 illustrates a variation of the invention employing a Fabry-Perot cavity.

As an example of other optical device configurations with which the invention may advantageously be employed, a Fabry-Perot cavity formed used a pair of oppositely oriented CFBGs mounted on a transducing material 55 is shown in FIG. 7. In this case, a pulse will be substantially (but imperfectly) reflected between the CFBGs with the frequency of reflections, which can be detected at either end of optical fiber 71 due to imperfect reflection, dependent on the path length between effective reflector locations in the CFBGs which, as discussed above, with vary will strain in fiber 71. As long as the length of optical fiber intervening between the CFBGs is short relative to the length of the respective CFBGs, elongation will be negligible and, in any, event, proportional to in either an additive or subtractive sense, depending on whether $\lambda_{B1}$ of the respective CFBGs are proximate or opposite each other. A pair of Fabry-Perot cavities with oppositely oriented pairs of CFBGs can thus provide some forms of compensation, as discussed above. Further, some types of compensation can be based on the decay rate or time of the amplitude of the train of reflections. Measurement is performed as a function of reflection frequency as an input energy pulse "rings" within the cavity and frequency based detectors may yield further increases in sensitivity or simplicity of detector circuitry or both.

In view of the foregoing, it is seen that the invention provides a methodology for sensing physical parameters with greatly increased sensitivity, dynamic range and spatial resolution with a very short length of optical fiber as well as for simulating much greater lengths of optical fiber in a sensor or transducer of small overall dimensions in a measurement system. Sensors utilizing the principles of the invention can be fabricated at reduced cost and/or be applied to measurements which could not heretofore be done while providing increased flexibility of design and/or sensor installation as well as improved performance. Sensitivity of the sensor or transducer can be further increased or changed at will by alteration of the wavelength of energy used for measurement. Sensitivity can also be increased by providing push-pull transducing effects by the simple expedient of relative orientation of transducer chirp. The invention may further provide for increased ease of dynamic calibration and inherent stabilization together with reduced susceptibility to noise and drift.

While the invention has been described in terms of a single preferred embodiment and variations thereof, those skilled in the art will recognize that the invention can be practiced with further modification within the spirit and scope of the appended claims.

Having thus described my invention, what I claim as new and desire to secure by Letters Patent of the United States is as follows:

1. A transducer responsive to changes of a physical parameter, said transducer including:
   an optical fiber including a chirped fiber Bragg grating, and a second chirped fiber Bragg grating, and wherein a chirp of said chirped fiber Bragg grating and a chirp of said second chirped fiber Bragg grating are oppositely oriented;
   means for applying an elastic strain to a portion of said optical fiber in response to said changes of said physical parameter;
   means for supplying a pulse of energy having a wavelength which can be reflected by said chirped fiber Bragg grating to said optical fiber; and
   means for detecting a propagation delay of said energy pulse through said optical fiber, said optical fiber including at least an effectively reflecting portion of said chirped fiber Bragg grating, and wherein said means for detecting a propagation delay includes means for detecting at least one of a frequency and a decay rate of reflections between said chirped fiber Bragg grating and said second chirped fiber Bragg grating in said optical fiber.

2. A method of measuring a physical parameter including the steps of:
   applying at least a portion of an energy pulse having a wavelength to an optical fiber including a fiber Bragg grating wherein the fiber Bragg grating is a chirped fiber Bragg grating;
   reflecting the wavelength from the fiber Bragg grating;
   applying strain to the fiber Bragg grating in response to the physical parameter; and
   determining propagation delay of the energy pulse in the optical fiber including a portion of the fiber Bragg grating effectively reflecting the wavelength of the energy pulse, and wherein the optical fiber includes a second chirped fiber Bragg grating, and wherein said step of determining a propagation delay includes the step of:
   detecting at least one of a frequency and a decay rate of reflections of the energy pulse between the chirped fiber Bragg grating and the second chirped fiber Bragg grating.

3. A transducer responsive to changes of a physical parameter, said transducer including:
   an optical fiber including a chirped fiber Bragg grating;
   means for applying an elastic strain to a portion of said optical fiber in response to said changes of said physical parameter;
   means for supplying a pulse of energy having a wavelength which can be reflected by said chirped fiber Bragg grating to said optical fiber;
   means for detecting a propagation delay of said energy pulse through said optical fiber, said optical fiber including at least an effectively reflecting portion of said chirped fiber Bragg grating;
   an optical path including a second optical fiber including a second chirped fiber Bragg grating; and
   a coupler/splitter means for receiving said energy pulse and directing said pulse into at least said optical fiber and said optical path;
   wherein a chirp of said chirped fiber Bragg grating and a chirp of said second chirped fiber Bragg grating are similarly oriented.

4. A transducer responsive to changes of a physical parameter, said transducer including:
   an optical fiber including a chirped fiber Bragg grating, and a second chirped fiber Bragg grating, and wherein a chirp of said chirped fiber Bragg grating and a chirp of said second chirped fiber Bragg grating are oppositely oriented, said chirped fiber Bragg grating adapted to receive and reflect a pulse of energy having a wavelength which can be reflected by said chirped fiber Bragg grating to said optical fiber;
   means for applying an elastic strain to a portion of said optical fiber in response to said changes of said physical parameter; and
   means for detecting a propagation delay of said energy pulse through said optical fiber, said optical fiber including at least an effectively reflecting portion of said chirped fiber Bragg grating, and wherein said means for detecting a propagation delay includes means for detecting at least one of a frequency and a decay rate of reflections between said chirped fiber Bragg grating and said second chirped fiber Bragg grating in said optical fiber.

5. The transducer of claim 1 wherein:
   said means for applying an elastic strain is a transduction material suitable for converting a desired measurement parameter into strain.

* * * * *